(12) United States Patent
Imediegwu

(10) Patent No.: US 7,972,239 B2
(45) Date of Patent: Jul. 5, 2011

(54) DUAL PUMP DESIGN FOR HYBRID ELECTRIC AUTOMATIC TRANSMISSION

(75) Inventor: Chino D. Imediegwu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 590 days.

(21) Appl. No.: 12/030,082

(22) Filed: Feb. 12, 2008

(65) Prior Publication Data

US 2009/0203497 A1 Aug. 13, 2009

(51) Int. Cl.
*B60K 5/08* (2006.01)
(52) U.S. Cl. .................. 477/2; 477/15; 477/20
(58) Field of Classification Search ............ 477/2, 5, 477/15, 20
See application file for complete search history.

(56) References Cited

U.S. PATENT DOCUMENTS

| | | | |
|---|---|---|---|
| 2,822,901 A * | 2/1958 | Forster | 477/176 |
| 4,866,622 A * | 9/1989 | Dreher et al. | 701/102 |
| 5,991,680 A * | 11/1999 | Kono et al. | 701/67 |
| 6,386,170 B1 | 5/2002 | Iwano et al. | |
| 6,450,275 B1 | 9/2002 | Gabriel et al. | |
| 6,504,474 B1 * | 1/2003 | Goodnight et al. | 340/439 |
| 6,523,519 B2 | 2/2003 | Iwano et al. | |
| 6,527,074 B1 | 3/2003 | Morishita | |
| 6,709,362 B2 | 3/2004 | Tomohiro et al. | |
| 6,739,305 B2 | 5/2004 | Takahara et al. | |
| 6,913,558 B2 | 7/2005 | Mori et al. | |
| 6,941,922 B2 | 9/2005 | Williams et al. | |
| 7,114,482 B2 | 10/2006 | Lane | |
| 7,244,208 B2 | 7/2007 | Bauknecht et al. | |
| 2007/0098567 A1 | 5/2007 | Johnson et al. | |

* cited by examiner

*Primary Examiner* — Ha D. Ho

(57) ABSTRACT

A dual pump strategy for a hybrid electric automatic transmission necessitating one internal mechanically driven pump linked to the engine output shaft and an external fixed displacement pump powered by a brushless permanent magnet motor consisting of a controller with closed loop feedback control for operating such is disclosed. In neutral and electric drive mode, with the engine off, the flow demand for the transmission is sustained largely by the external pump.

20 Claims, 6 Drawing Sheets

DUAL PUMP DESIGN FOR HYBRID ELECTRIC AUTOMATIC TRANSMISSION

TECHNICAL FIELD

This disclosure relates generally to systems and methods for hybrid power control and, more particularly, to systems and methods for controlling a dual hydraulic pump system in a hybrid vehicle employing a hydraulic transmission.

BACKGROUND

Many construction machines, transportation devices, and other equipment employ an engine as a primary power source, with a number of other systems being driven off of the engine output. For example, in certain construction machines, a number of machine functions and operations are executed via hydraulic power. In such machines, a hydraulic pump is keyed to and driven by the engine output to supply hydraulic power to the machine components.

However, the hydraulic requirements of a machine are not necessarily directly related to the engine speed. For example, during a period of high engine speed, there may be little or no hydraulic power required under certain circumstances. Conversely, during periods of low engine speed, circumstances may dictate that a high level of hydraulic power is required. Thus, there is a certain intractable inefficiency resulting from the direct drive of the hydraulic pump from the engine output. If a smaller and more efficient pump is fitted to the engine, the pump may be unable to supply the machine's maximum hydraulic needs. However, if a larger less efficient pump is fitted to the engine, then while the pump will always be able to supply the required hydraulic flow, it will be underutilized during all but the most extreme operations.

Moreover, certain machines operate in a hybrid manner rather than relying exclusively on engine power. That is, such machines are capable of operating exclusively on electrical power, exclusively on engine power, or on a combination of the two. For example, both drive types may be used together when substantial acceleration is required, but the engine may be shut down or idled in favor of the electric drive mode of operation during machine launch conditions and low-speed cruise conditions. In such hybrid machines, the exclusive use of a single direct drive hydraulic pump will mean that hydraulic power is completely unavailable during electric drive.

Thus, it will be appreciated from this disclosure that the traditional engine-driven hydraulic pump causes issues of inefficiency (or lack of capacity) in many machines, and also results in a loss of hydraulic flow during electric drive operating modes in hybrid machines.

Although the resolution of deficiencies, noted or otherwise, of the prior art has been found by the inventors to be desirable, such resolution is not a critical or essential limitation of the disclosed principles. Moreover, this background section is presented as a convenience to the reader who may not be of skill in this art. However, it will be appreciated that this section is too brief to attempt to accurately and completely survey the prior art. The preceding background description is thus a simplified and anecdotal narrative and is not intended to replace printed references in the art. To the extent an inconsistency or omission between the demonstrated state of the printed art and the foregoing narrative exists, the foregoing narrative is not intended to cure such inconsistency or omission. Rather, applicants would defer to the demonstrated state of the printed art.

SUMMARY

In one aspect, the disclosure pertains to an improved machine for hybrid drive operation. The improved machine includes a primary power source and an alternative power source, both power sources being coupled to the machine propulsion means via a hydraulic transmission operated via a plurality of hydraulic clutches. In a further aspect, the machine includes a primary hydraulic pump linked to the primary power source such that the primary hydraulic pump is driven by the primary power source. The primary hydraulic pump is fluidly connected to the hydraulic transmission to supply pressurized hydraulic fluid to the transmission for shifting and lubrication. In this aspect, the machine includes a secondary hydraulic pump that is also fluidly connected to the hydraulic transmission. A pump motor drives the secondary hydraulic pump responsive to a pump motor controller based on a three-dimensional map linking a desired pump speed to a two-dimensional variable array. In this way, the combined output of the primary hydraulic pump and the secondary hydraulic pump meets a required transmission hydraulic fluid flow to provide sufficient fluid flow for adequate lubrication and proper shift performance.

Further aspects of the disclosed principles will be appreciated from the following description, including the associated figures of which:

DETAILED DESCRIPTION

This disclosure relates to the operation of hydraulic machine components, and more specifically pertains in an embodiment to a system and apparatus for providing hydraulic flow to a hydraulic transmission in an efficient manner during engine, electric, or hybrid drive modes. The disclosed dual pump system employs an internal pump linked to the machine engine as well as an external fixed displacement hydraulic pump powered via an electric drive such as a high-voltage internal permanent magnet motor. The pump drive motor may operate in conjunction with a controller running a closed loop feedback control, such that in certain operating conditions the required hydraulic flow for transmission operation is supplied exclusively by the external pump, while in other operating conditions the hydraulic requirements are supplied by the internal and external pumps operating in concert.

In another embodiment, the external pump is used to supply hydraulic flow during driveline PTO operations. Such operations entail disconnection of the driveline from machine transport facilities, e.g., wheels or tracks, and connection of the driveline to an auxiliary system, e.g., a water pump. Typical environments for the use of driveline PTO facilities include, but are not limited to, emergency personnel transport equipment and the like.

Figure 1:
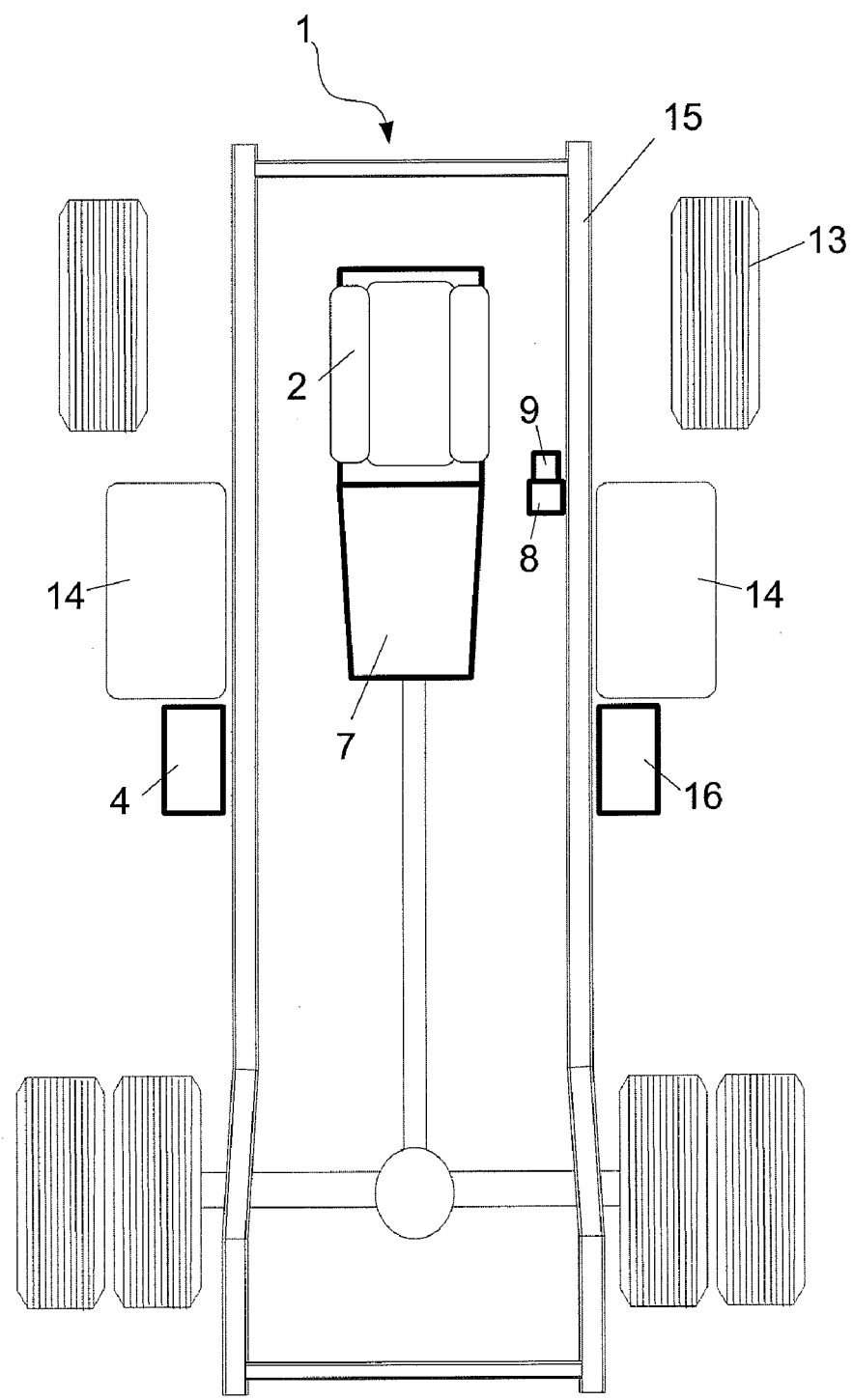
FIG. 1 is a simplified view of a dual pump hybrid machine in accordance with the disclosed principles.

FIG. 1 is a simplified view of a dual pump hybrid machine 1 in accordance with the disclosed principles. The illustration of FIG. 1 is intended to convey the location in an embodiment of a minimal set of machine components, and is not intended to show every component of such a machine. Those of skill in the art will appreciate the arrangement, construction, and operation of all standard elements not shown in FIG. 1.

The machine 1 includes an engine 2, linked to the vehicle traction system, e.g., wheels 13, via a transmission 7. The engine 1 may be fueled by gasoline, diesel fuel, or other fuel stored in tanks 14. In addition to driving a primary hydraulic pump (not shown), the engine 1 also generates electrical power to perform a number of functions, including driving a secondary hydraulic pump 8 via a pump motor 9. In an embodiment, the secondary hydraulic pump 8 and pump motor 9 are fixed to each other and are mounted as a unit against the frame 15 of the machine 1. Also mounted to the frame is an accessory converter 16 for receiving electrical power and converting it, generally to a different voltage, for use by one or more accessory systems of the machine 1. The secondary hydraulic pump 8 may be used for other functions such as PTO operations.

Figure 2:
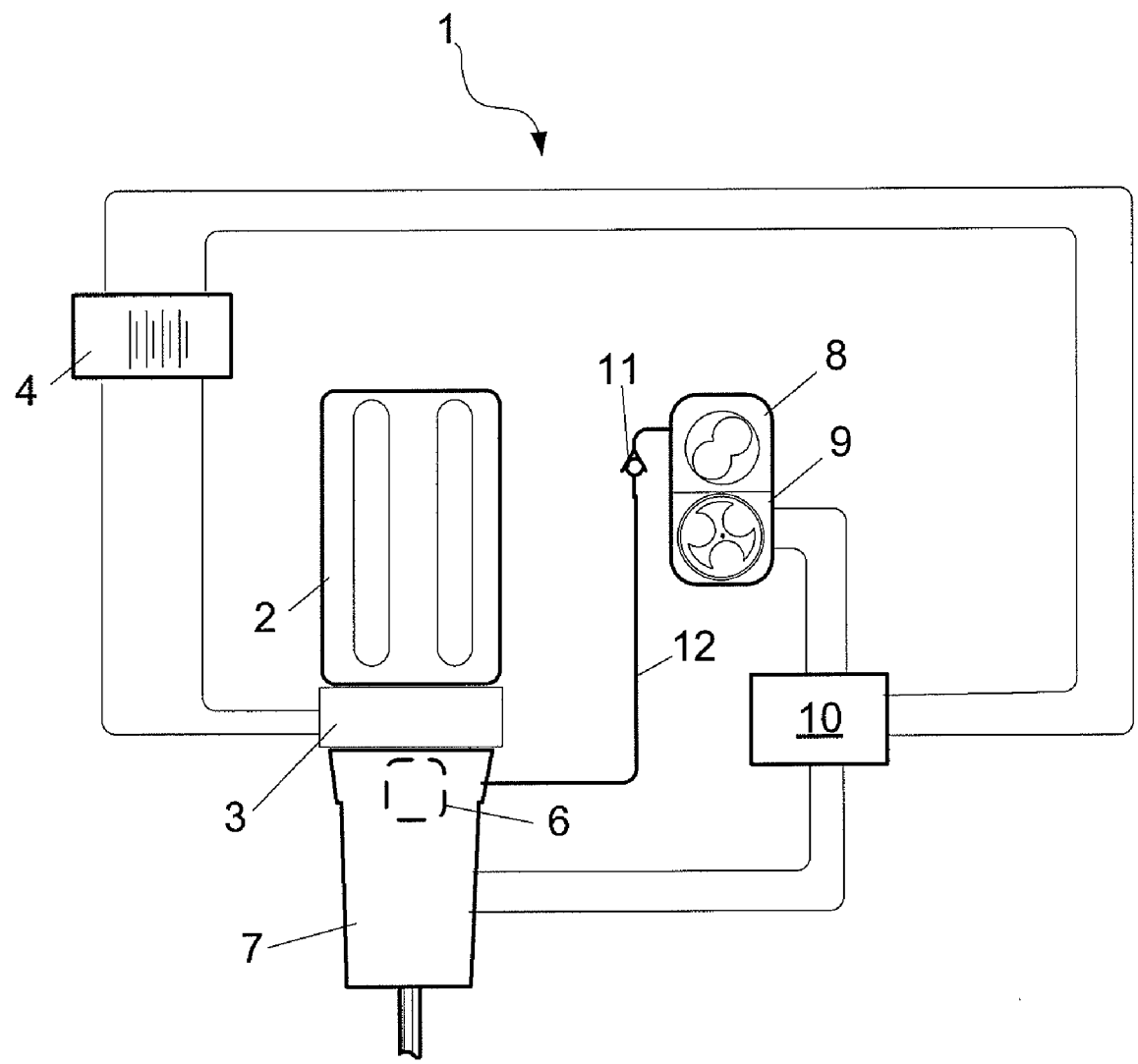
FIG. 2 is a schematic component view of a dual pump hybrid machine in accordance with the disclosed principles.

FIG. 2 is a schematic view of the dual pump hybrid machine 1 in accordance with the disclosed principles. The machine 1 includes a primary power source such as an engine 2, as well as an alternative power source such as an electric drive motor/generator 3. Both the engine 2 and the electric drive motor/generator 3 are linked via a transmission 7 to wheels or tracks (e.g., wheels 13, not shown in FIG. 2) to propel the machine 1. In an embodiment, the transmission 7 is a hydraulic transmission that utilizes hydraulic clutches to execute shifts between transmission ratios, e.g., in response to changing speed and/or load.

As noted above, the engine 1 is typically fuel-powered, e.g., by diesel gas, or natural gas fuel supplied from a tank (not shown in FIG. 2) as will be appreciated by those of skill in the art. For electric drive, the electric drive motor/generator 3 is powered by an electric current supplied by a battery 4 or other electrical power source. Alternative electrical power sources include fuel cells, capacitor banks, and the like, as will be appreciated by those of skill in the art.

In an embodiment, the transmission 7 includes a primary hydraulic pump 6. In this way, the primary hydraulic pump 6 supplies hydraulic power to the transmission 7 and other hydraulic components of the machine 1 at a maximum level that is typically a function of the speed of the engine 2 while the engine 2 is running. However, when the engine 2 is not running, the primary hydraulic pump 6 is unable to supply sufficient hydraulic power.

The machine 1 may also include a secondary hydraulic pump 8 driven by a pump motor 9, which may be a high-voltage internal permanent magnet motor in an embodiment. In this way, when the engine 2 is not running, the pump motor 9 may drive the secondary hydraulic pump 8 to provide hydraulic power for operation of the transmission 7 as well as other hydraulic functions of the machine 1. The secondary hydraulic pump 8 may be operated independently of the primary hydraulic pump 6.

In an embodiment, the primary hydraulic pump 6 is sized so as to provide less than the potential peak hydraulic power required by the machine 1, and the secondary hydraulic pump 8 is used in conjunction with the primary hydraulic pump 6 to meet instantaneous peak hydraulic power demands during engine only drive. In this way, the primary hydraulic pump 6 does not impose an excessive drag on the engine 2, but the peak hydraulic requirements of the machine 1 can still be accommodated. Similarly, while in electric only drive, the machine may require the use of the engine 2 to drive the primary hydraulic pump 6 if the instantaneous peak hydraulic demand cannot be met by the secondary hydraulic pump 8.

The output of the secondary hydraulic pump 8 is linked into the hydraulic circuit in an embodiment by a check valve 11 tied to a supply line 12. The supply line 12 may directly feed hydraulic systems of the machine 1, or more typically may run through an accumulator and/or filter (not shown) or other control or processing component prior to supplying fluid for use.

A controller 10, which may or may not be embodied within another controller such as an engine or transmission controller (not shown in FIG. 1), is used in an embodiment to control the operation of the secondary hydraulic pump 8, e.g., by controlling the supply of electrical power from the battery 4 to the pump motor 9. The controller 10 is electrically linked to the transmission 7 in order to sense transmission ratios, torques, speeds, and/or other conditions for the use of the secondary hydraulic pump 8. For example, as will be described in greater detail hereinafter, in certain transmission gear ratios, the required hydraulic flow is sustained by the secondary hydraulic pump 8 alone, whereas in other transmission gear ratios, the required hydraulic flow is sustained by the combined operation of the primary hydraulic pump 6 and the secondary hydraulic pump 8.

Figure 3:
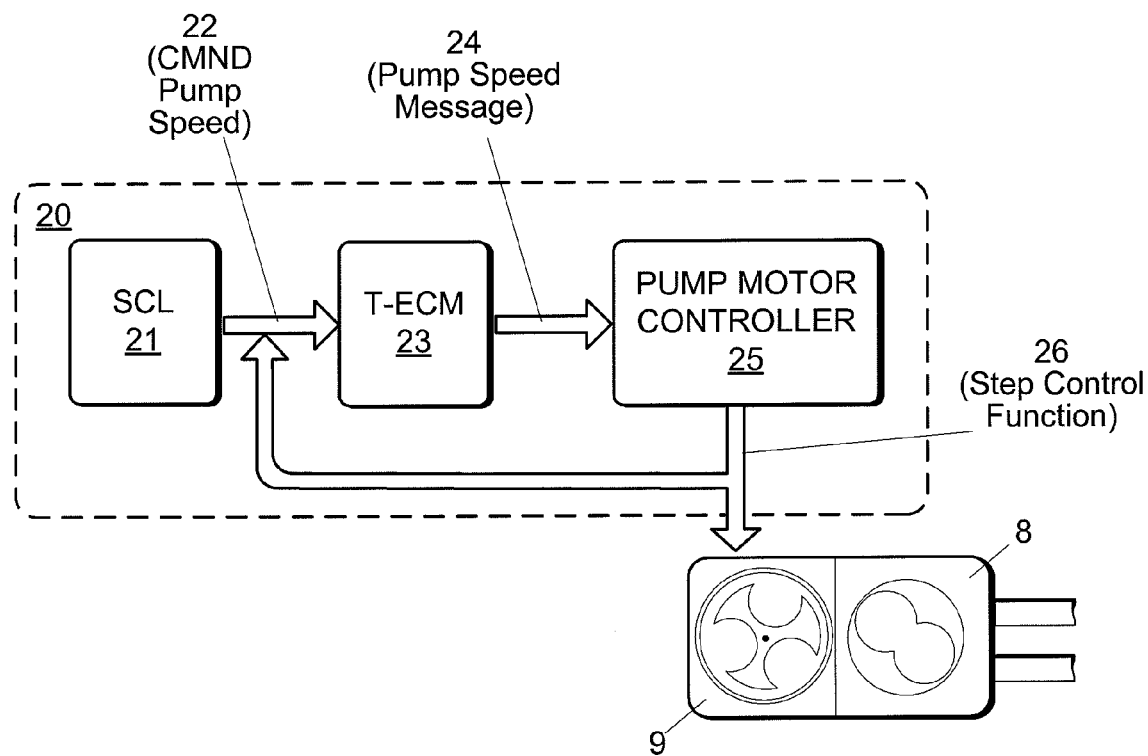
FIG. 3 is a schematic diagram of the control configuration for controlling a secondary hydraulic pump in accordance with the disclosed principles.

The component configuration and data flow strategy for controlling the secondary hydraulic pump 8 via control of the pump motor 9 is shown schematically in FIG. 3. The illustrated control system 20, which may be or may include the controller 10 shown in the schematic view of FIG. 2, controls the secondary hydraulic pump 8 during shift events as described below, but it will be appreciated that the illustrated control system 20 also controls the secondary hydraulic pump 8 during other times that the secondary hydraulic pump 8 is required to run. For example, the illustrated control system 20 may also control the secondary hydraulic pump 8 to provide flow for driveline PTO operation.

In the illustrated control system 20, the shift control logic (SCL) for the transmission which resides in the transmission electronic control module (T-ECM) is responsible for the execution of both the shift and clutch control strategy for the transmission. SCL 21 (shift control logic) collects data from relevant machine systems to determine the control strategy for shift execution on the transmission and for clutch actuation such that a smooth and timely shift is assured. The pump control for the secondary hydraulic pump 8 is embedded in the shift control logic such that the secondary pump speed is determined as a function of the current desired gear and engine output shaft speed as specified by the shift logic. A multivariable array, which is central to the supervisory pump controls, defines a surface that characterizes the required secondary pump speed that is necessary to provide hydraulic flow to the hydraulic transmission over the entire operating speed range for the machine 1. In an embodiment, SCL 21 determines, based on user input (e.g., operation of speed and/or torque control lever or pedal) or automatic machine control signals (e.g., pursuant to automatic speed and/or torque-based shift logic), a desired gear to which the transmission 2 will shift, an anticipated speed and an engine output speed (EOS). SCL 21 may also predict a TOS for the shift.

In embodiment, SCL 21 also collects data regarding actual and/or anticipated engine speed of the engine 2 to predict the amount of fluid, if any, that will be available from the primary hydraulic pump 6 during the shift event. If the engine 2 is at a low speed, the amount of fluid will be low, whereas if the engine 2 is at a high speed, very little additional fluid may be required. If the engine 2 is not operating, i.e., the machine 1 is operating in electric only drive, then the secondary hydraulic pump 8 will need to supply the entirety of the required fluid flow to execute the shift.

At the start of a shift event, SCL 21 calculates a desired pump speed for the secondary hydraulic pump 8 based on the current gear, anticipated gear, Engine Output Shaft Speed (EOS), Transmission Output Shaft Speed (TOS), and anticipated motor speed. In furtherance of the shift, SCL 21 derives a command pump speed signal 22 for use by the T-ECM module 23 (transmission electronic control module). In response to receipt of the command pump speed signal 22, the T-ECM module 23 generates a required pump speed message 24 for transmission to the pump motor controller 25, which then outputs a step control function 26 to the pump motor 9 to control the speed of the secondary hydraulic pump 8.

In an embodiment, the pump motor controller 25 utilizes a closed loop control scheme wherein certain parameters are measured at the interface between the pump motor controller 25 and the pump motor 9. The voltage across the pump motor 9 (bus voltage) and the current drawn by the pump motor 9 (bus current) are measurable on the interface between the pump motor controller 25 and the pump motor 9, and certain other parameters are fed back from the pump motor 9 and secondary hydraulic pump 8.

Thus, in the illustrated embodiment, the feedback signal from the interface between the pump motor controller 25 and the pump motor 9 includes the actual pump speed, bus current, bus voltage, rotor speed, and direction of rotation. These parameters are input to the T-ECM module 23 to further refine the required pump speed message 24, and thus the step control function 26.

As noted above, the speed of the secondary hydraulic pump 8 is controlled so that peak hydraulic requirements of the machine 1 may be met, e.g., during shift events, but that excess flow is not generated by the secondary hydraulic pump 8 beyond that supplied by the primary hydraulic pump 6. In an embodiment, this control is executed by SCL 21 using a multivariable mapping to associate secondary hydraulic pump 8 speed with transmission gear and engine output speed. In general, low engine output speeds result in low fluid flow from the primary hydraulic pump 6. Also generally true, different transmission gears require different lubrication and shift flows as clutches of different sizes are employed in the execution of various gears. Higher gears (higher output/input ratios) require marginally higher flows for lubrication purposes although typically, the engine output shaft speed is largely sufficient for satisfying flow demands at these higher gears.

Figure 4:
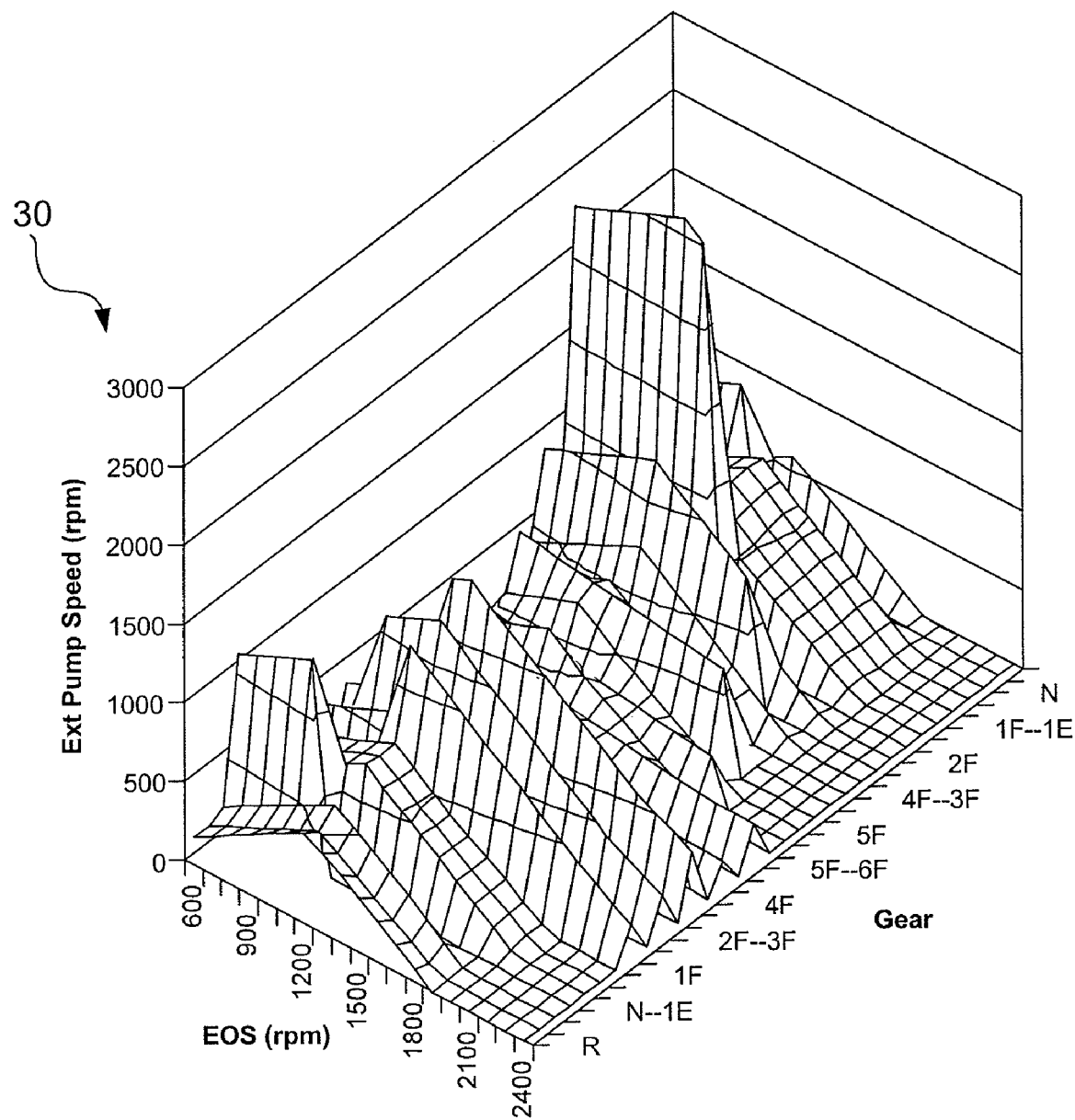
FIG. 4 is an active flow control three-dimensional speed plot of the required speed for a secondary hydraulic pump as a function of engine output speed and transmission gear in accordance with the disclosed principles for a minimal supplementation.

The active flow control three-dimensional speed plot 30 of FIG. 4 illustrates the required speed for the secondary hydraulic pump as a function of two-dimensional variable array of engine output speed (EOS) and transmission gear. It will be appreciated that although the active flow control three-dimensional speed plot 30 is a function of engine gear, it may alternatively be a function of transmission ratio, e.g., in a continuously variable transmission. As can be seen, the required speed for the secondary hydraulic pump 8 varies from 0 RPM at high engine speed and steady state transmission ratio to about 2250 RPM for low engine speed and demanding shift conditions. Thus, for example, when the engine output speed is at low idle (about 600 RPM) and the transmission shifts between Neutral (N) and 1 E, the required speed for the secondary hydraulic pump 8 is about 1000 RPM.

It will be appreciated that the active flow control three-dimensional speed plot 30 does not take into account additional hydraulic loads that the machine 1 may impose, and that in an embodiment such additional loads are also accounted for. For example, unusual steering loads or other hydraulic loads, or driveline PTO operation may require additional output speed of the secondary hydraulic pump 8.

Figure 5:
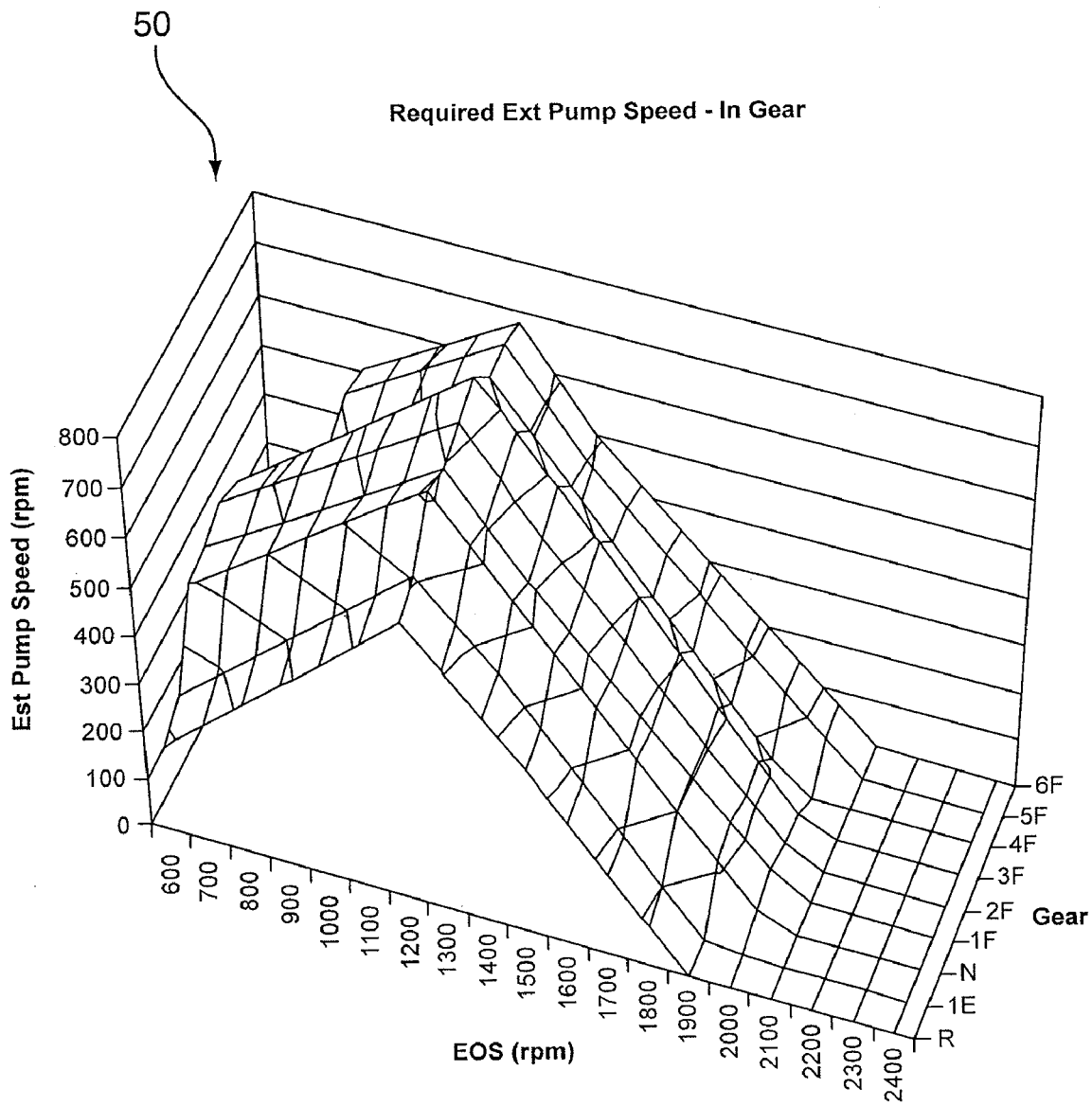
FIG. 5 is a passive flow control three-dimensional speed plot of the required speed for a secondary hydraulic pump as a function of engine output speed and transmission gear in accordance with the disclosed principles for a conservative supplementation.

The passive flow control three-dimensional speed plot 50 of FIG. 5 illustrates the required speed for the secondary hydraulic pump as a function of two-dimensional variable array of engine output speed (EOS) and transmission gear in a more conservative scenario. In this alternative scenario, the required speed for the secondary hydraulic pump 8 varies from 0 RPM at high engine speed and steady state transmission ratio to about 800 RPM for low engine speed and demanding shift conditions.

Figure 6:
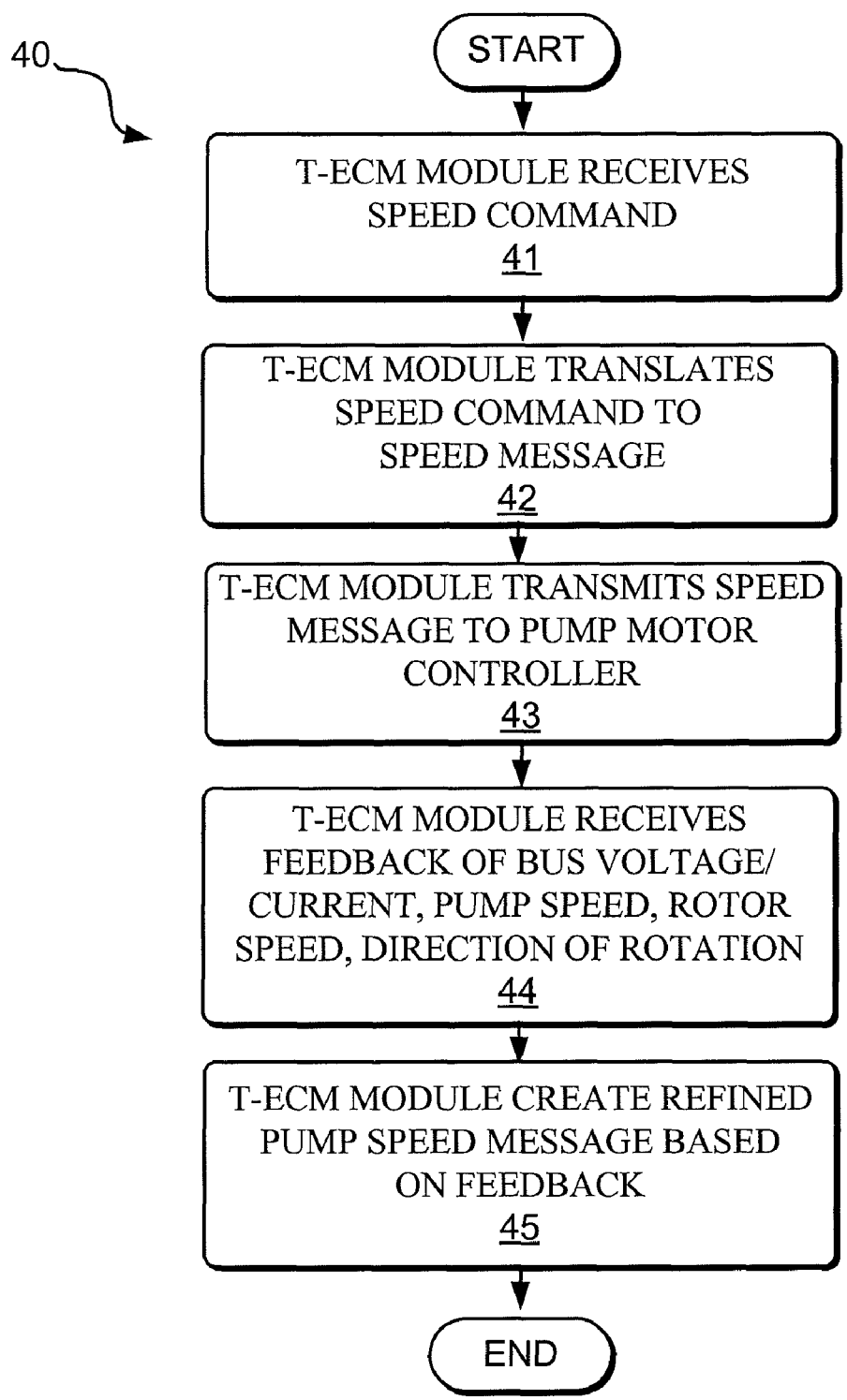
FIG. 6 is a flow chart illustrating a process for controlling the speed of the secondary hydraulic pump in accordance with the disclosed principles.

The flow chart of FIG. 6 illustrates a process 40 executable in the T-ECM module 23 for controlling the speed of the secondary hydraulic pump 8. At stage 41 of the process 40, the T-ECM module 23 receives a speed command (e.g., command pump speed signal 22). The T-ECM module 23 translates the speed command to a speed message (e.g., pump speed message 24) at stage 42, for transmission to the pump motor controller 25 at stage 43. As noted above, the pump motor controller 25 outputs a step control function 26 to the pump motor 9 to control the speed of the secondary hydraulic pump 8.

Subsequently at stage 44, the T-ECM module 23 receives a feedback signal from the interface between the pump motor controller 25 and the pump motor 9. In an embodiment, the feedback signal includes signals representative of the bus voltage, bus current, actual pump speed, rotor speed, and direction of rotation. At stage 45, the T-ECM module 23 creates a refined pump speed message 24 based on the speed command and the feedback signal so that the actual pump speed more closely matches a pump speed associated with the speed command.

When the machine 1 is being employed for driveline PTO, the T-ECM module 23 may account for this by maximizing the pump speed message 24. Alternatively, the T-ECM module 23 may be uninformed of the driveline PTO operation, but the speed command to the T-ECM module 23 takes into account the driveline PTO operation. Similarly, other additional hydraulic loads may be accommodated by the T-ECM module 23 or may be incorporated into the speed command to the T-ECM module 23. In the case where the T-ECM module 23 takes the additional loads into consideration in deriving the pump speed message 24, it may add an offset to the speed indicated by the speed command, or may employ a gain multiplier or other increasing factor in an appropriate amount.

In this way, a smaller primary hydraulic pump 6 may be used without sacrificing peak fluid flow capacity, and hybrid operation may be executed more easily with reduced likelihood for an inadequately lubricated transmission 7. This increases the operating efficiency of the dual pump configuration by running the secondary hydraulic pump 8 at lower speeds when reduced flow requirements exist.

INDUSTRIAL APPLICABILITY

The present disclosure is applicable to hybrid machines that employs a hydraulic transmission, i.e., a transmission actuated by hydraulic clutches. In particular, the disclosed principles provide a mechanism for improving the operation of such hydraulic clutches as well as other hydraulic functions in a machine having a relatively small primary hydraulic pump 6. This system may be implemented in on-highway or off-highway machines, construction machines, industrial machines, etc. Although many machines that may benefit from the disclosed principles will be used for personal and material transport, it will be appreciated that the disclosed teachings are beneficially applicable in other contexts as well, and the disclosed teachings are likewise broadly applicable.

Using the disclosed principles, a hybrid powered machine is able to operate in an efficient and effective manner without generating wasteful excessive hydraulic flow and without impaired operation from insufficient hydraulic flow. The disclosed dual pump system employs an internal primary pump linked to the machine engine as well as an external secondary fixed displacement hydraulic pump powered via an electric drive such as a high-voltage internal permanent magnet motor. The pump drive motor is operated via a controller running a closed loop feedback control program, such that the secondary fixed displacement external pump speed is iteratively adjusted based on measured actual pump speed and other salient parameters. The external pump is also employed to supply hydraulic flow to the machine during driveline PTO operations, e.g., in emergency personnel transport equipment and the like.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. An improved machine for hybrid drive operation having a primary power source and an alternative power source, both power sources being coupled to a machine propulsion means via a hydraulic transmission operated via a plurality of hydraulic clutches, the machine comprising:
    a primary hydraulic pump linked to the primary power source such that the primary hydraulic pump is driven by the primary power source, the primary hydraulic pump being fluidly connected to the hydraulic transmission to supply pressurized hydraulic fluid to the transmission for shifting and lubrication;
    a secondary hydraulic pump, the secondary hydraulic pump also being fluidly connected to the hydraulic transmission to supply pressurized hydraulic fluid to the transmission for shifting and lubrication;
    a pump motor linked to the secondary hydraulic pump to drive the secondary hydraulic pump; and
    a pump motor controller adapted to direct the operation of the secondary hydraulic pump based on a three-dimensional map linking a desired pump speed to a two-dimensional variable array, whereby a combined output of the primary hydraulic pump and the secondary hydraulic pump meets a required transmission hydraulic fluid flow over an entire operating speed range of said transmission.

2. The improved machine for hybrid drive operation according to claim 1, wherein the primary power source is an engine and the transmission operates in a selected one of multiple gears, wherein the two-dimensional variable array includes variables associated with engine output speed and transmission gear.

3. The improved machine for hybrid drive operation according to claim 2, wherein the three-dimensional map includes transition regions specifying a desired pump speed as a function of engine output speed during transitions between transmission gears.

4. The improved machine for hybrid drive operation according to claim 1, wherein the primary hydraulic pump and the secondary hydraulic pump are fluidly linked to the transmission via a plurality of check valves.

5. The improved machine for hybrid drive operation according to claim 1, wherein the pump motor is a brushless high-voltage electric motor.

6. The improved machine for hybrid drive operation according to claim 1, wherein the pump motor controller operates via a closed loop control strategy based on at least an actual speed of the secondary hydraulic pump.

7. The improved machine for hybrid drive operation according to claim 1, wherein the pump motor controller is adapted to modify the desired pump speed based on the operation of the machine.

8. The improved machine for hybrid drive operation according to claim 7, wherein the pump motor controller is adapted to increase the desired pump speed when the machine is operating in a driveline PTO mode.

9. A pump motor controller for controlling a secondary hydraulic pump in a hybrid drive machine having a primary power source and a primary hydraulic pump linked to the primary power source such that the primary hydraulic pump is driven by the primary power source, the primary hydraulic pump and secondary hydraulic pump being fluidly connected to a hydraulic transmission to supply pressurized hydraulic fluid to the transmission for shifting and lubrication, the controller comprising:
    control logic for receiving a desired pump speed based on a three-dimensional map linking the desired pump speed to a two-dimensional variable array; and
    a control output for controlling a pump motor for driving the secondary hydraulic pump, such that a combined output of the primary hydraulic pump and the secondary hydraulic pump meets a required transmission hydraulic fluid flow over an entire operating speed range of said machine.

10. The pump motor controller according to claim 9, wherein the primary power source is an engine and the transmission operates in a selected one of multiple gears, wherein the three-dimensional map includes dimensions associated with engine output speed and transmission gear.

11. The pump motor controller according to claim 10, wherein the three-dimensional map includes transition regions specifying the desired pump speed as a function of engine output speed during transitions between transmission gears.

12. The pump motor controller according to claim 9, wherein the primary hydraulic pump and the secondary hydraulic pump are fluidly linked to the transmission via a plurality of check valves.

13. The pump motor controller according to claim 9, wherein the control output is adapted to drive a brushless high-voltage electric motor.

14. The pump motor controller according to claim 9, wherein the pump motor controller operates via a closed loop control strategy based on at least an actual speed of the secondary hydraulic pump.

15. The pump motor controller according to claim 9, wherein the pump motor controller is adapted to modify the desired pump speed based on the operation of the machine.

16. The pump motor controller according to claim 15, wherein the pump motor controller is adapted to increase the desired pump speed when the machine is operating in a driveline PTO mode.

17. A computer-readable medium having thereon an array of triplets for use in deriving a speed for a secondary hydraulic pump in a hybrid vehicle having a transmission and a primary hydraulic pump driven by an engine, each triplet having first, second, and third fields, wherein the first field of each triplet specifies an engine speed, the second field of each triplet specifies a transmission shift condition, and the third field of each triplet specifies a secondary hydraulic pump speed.

18. The computer-readable medium according to claim 17, wherein the transmission condition is one of a transmission gear and a transmission transition between two gears.

19. The computer-readable medium according to claim 17, wherein in at least a portion of the array of triplets, triplets with a transmission condition as a transmission transition between two gears are associated with higher secondary hydraulic pump speed than triplets with a transmission condition as transmission gear.

20. The computer-readable medium according to claim 17, wherein for triplets having a first field indicating an engine speed higher than a predetermined threshold speed, the third field specifies zero secondary hydraulic pump speed.

\* \* \* \* \*